United States Patent [19]

Wakahara et al.

[11] Patent Number: 5,422,784
[45] Date of Patent: Jun. 6, 1995

[54] HOUSING ARRANGEMENT FOR A DATA PROCESSING APPARATUS HAVING A REMOVABLY MOUNTED CIRCUIT BOARD ABOVE AN OPENING IN A TOP SHELL

[75] Inventors: Hiroshi Wakahara, Ikoma; Isao Shimada, Yao, both of Japan

[73] Assignee: Matsushita Electric Industrial Co., Ltd., Osaka, Japan

[21] Appl. No.: 97,444

[22] Filed: Jul. 26, 1993

[30] Foreign Application Priority Data

Jul. 27, 1992 [JP] Japan ............................ 4-199383
Jul. 27, 1992 [JP] Japan ............................ 4-199384

[51] Int. Cl.⁶ .................. H05K 5/02; H05K 7/02; G06F 1/16; H01M 2/10
[52] U.S. Cl. ........................ 361/680; 429/65; 429/100; 361/736; 361/683
[58] Field of Search .............. 400/693; 364/708.1; 429/9, 65, 96–100; 312/223.2; 361/679–686, 736, 752

[56] References Cited

U.S. PATENT DOCUMENTS

| 4,235,490 | 11/1980 | Schwartz et al. | 211/41 X |
| 4,333,155 | 6/1982 | Johnston | 361/680 |
| 4,577,286 | 3/1986 | Yoshimura et al. | 361/683 |
| 4,980,522 | 12/1990 | Murakami et al. | 361/680 X |
| 5,153,817 | 10/1992 | Hosoi et al. | 361/683 |

FOREIGN PATENT DOCUMENTS 4-25914 1/1992 Japan.
4-55921 2/1992 Japan.

Primary Examiner—Michael W. Phillips
Attorney, Agent, or Firm—Ratner & Prestia

[57] ABSTRACT

The housing arrangement for a data processing apparatus has a top shell with an opening in the top thereof, a bottom shell on which the top shell is mounted, an electrical circuit board housed in the opening of the top shell, and a keyboard positioned on the electrical circuit board. A covering member is provided to cover the terminals of the battery unit when it is not installed and to partially block the dock when the battery unit is installed.

11 Claims, 6 Drawing Sheets

HOUSING ARRANGEMENT FOR A DATA PROCESSING APPARATUS HAVING A REMOVABLY MOUNTED CIRCUIT BOARD ABOVE AN OPENING IN A TOP SHELL

BACKGROUND OF THE INVENTION

1. Field of the Invention

The present invention relates to a housing arrangement for a data processing apparatus, such as a personal computer, word processor, or a similar data processing device.

2. Description of the Prior Art

As personal computers, word processors, and similar data processing devices have become thinner and more compact in the last few years, portable computers commonly known as "notebook" computers have become widely available. The strong demand for improved radiation shielding, manufacturability, and serviceability that characterizes the personal computing device market has been made even greater in the notebook computer market by intense competition.

A data processing apparatus according to this prior art is described below with reference to the accompanying figures.

A partially exploded view of this conventional data processing apparatus is shown in FIG. 1, and a cross section of the major connecting components is shown in FIG. 2. This main housing 1 comprises a top shell 2, bottom shell 3, display 4, electrical circuit board (mother board) 5 containing the major electrical circuitry, a keyboard 6, mounting screws 7, keyboard mounting bracket 8, hard disk drive (HDD) unit 9, a floppy disk drive (FDD) unit 10, a conductive reinforcing panel 11 under the keyboard 6, and a radiation shield 12 to block radiation from the mother board 5. Other typical components are not shown to simplify the description.

The assembly of the main housing 1 above is described below with reference to FIGS. 1 and 2.

As shown in FIG. 1, the HDD unit 9 and FDD unit 10 are mounted on the bottom shell 3. The mother board 5 and keyboard mounting bracket 8 are then positioned with the mounting screws 7, and the keyboard 6 is secured to the keyboard mounting bracket 8 with the mounting screws 7. With the display 4 attached, the top shell 2 is then placed over the bottom assembly and fastened to the bottom shell 3 using screws (not shown in the figures). The radiation shield 12 is then fastened to the top shell 2 sandwiched between the top shell 2 and keyboard 6.

With this construction, however, designing a low profile (thin) main housing 1 is complicated, many screws are used, and assembly is difficult because of the method of assembly, specifically assembling the mother board 5 between the top shell 2 and bottom shell 3, securing the various components with mounting screws 7, and inserting a radiation shield 12 into the assembly. During assembly and disassembly for repair or maintenance, many components must also be installed and removed in order to remove and service the mother board 5 and keyboard 6. These various problems have inhibited the development and manufacture of compact data processing apparatuses with good portability.

SUMMARY OF THE INVENTION

Therefore, an object of the present invention is to provide a housing arrangement for a data processing apparatus that is compact and extremely portable, simplifies the design of low profile data processing apparatuses, eliminates the need for extra radiation shield components, enables simple modification of specifications, and can be easily serviced.

To achieve this object, a housing arrangement for a data processing apparatus according to the present invention comprises a top shell with an opening in the top thereof, a bottom shell on which the top shell is mounted, an electrical circuit board housed in the opening of the top shell, and a keyboard positioned on the electrical circuit board.

BRIEF DESCRIPTION OF THE DRAWINGS

The present invention will become more fully understood from the detailed description given below and the accompanying diagrams wherein.

DESCRIPTION OF PREFERRED EMBODIMENT

The preferred embodiment of a housing arrangement for a data processing apparatus according to the invention is described below with reference to FIGS. 3 and 4.

Figure 1:
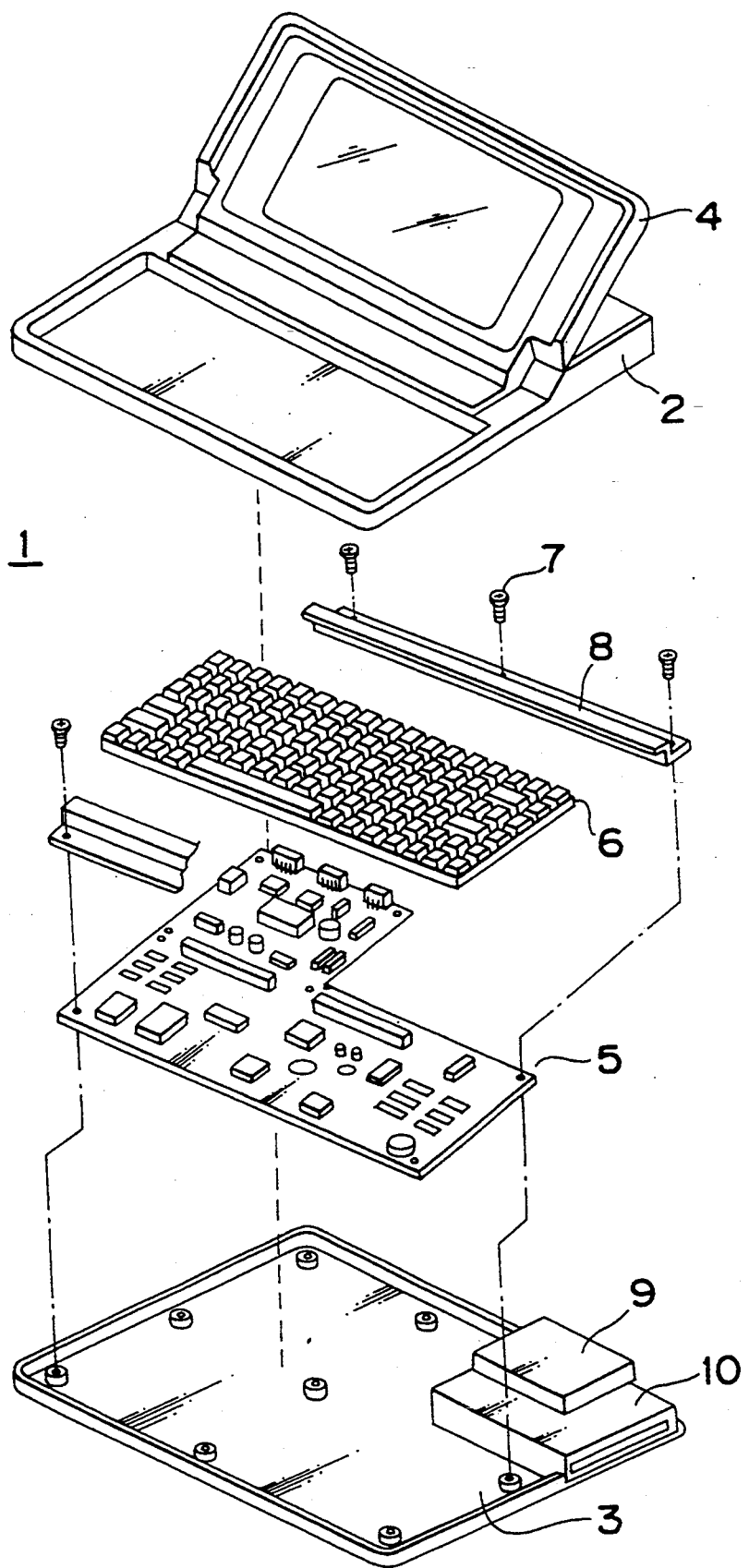
FIG. 1 is an exploded view of a prior art housing arrangement for a data processing apparatus.
Figure 2:
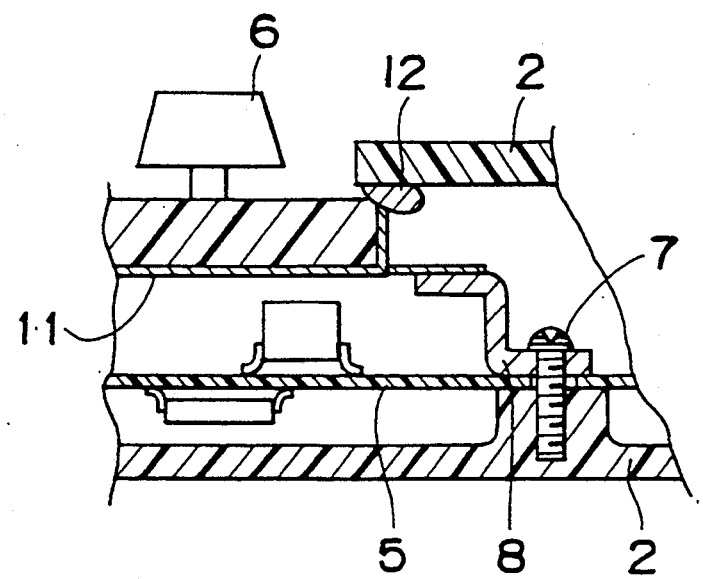
FIG. 2 is a side cross section of the major components in the prior art housing arrangement shown in FIG. 1.
Figure 3:
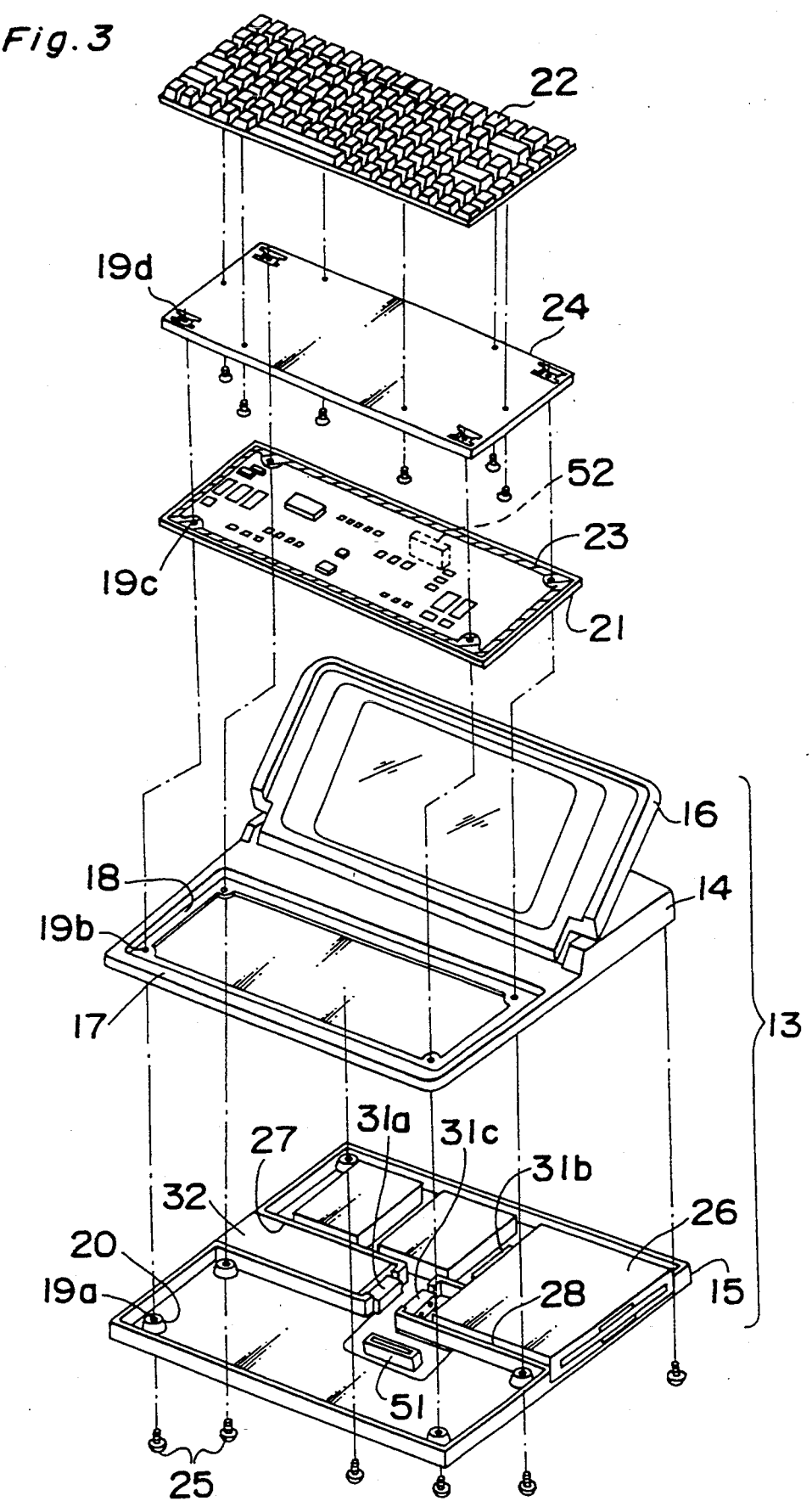
FIG. 3 is an exploded view of a housing arrangement for a data processing apparatus according to the preferred embodiment of the invention.
Figure 4:
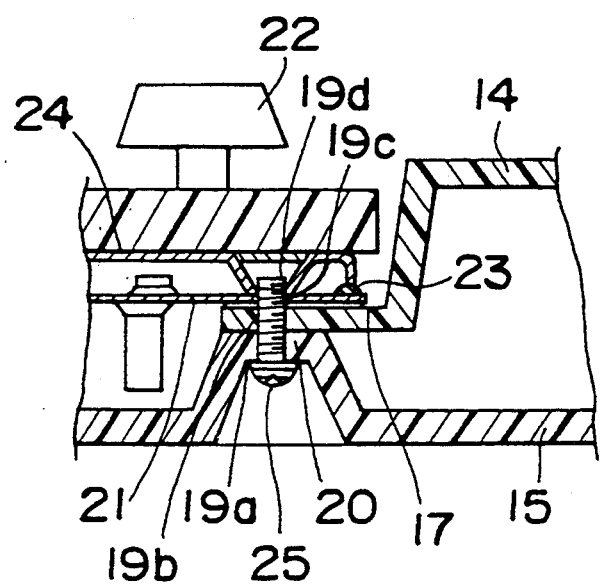
FIG. 4 is a side cross section of the major components in the embodiment shown in FIG. 3.

Referring to FIG. 3, the main housing 13 comprises a top shell 14 and a bottom shell 15. The display 16 is mounted to the main housing 13 so that it can pivot open and closed. The top shell 14 comprises an opening 18 with a frame 17, and is mounted on the bottom shell 15. The bottom shell 15 has an electrical connector 51 connected through a flexible circuit plate to various electric components equipped in the bottom shell 15. The electrical circuit board (mother board) 21, containing the major circuit components and a connector 52 for connection with the connector 51, is mounted in the frame 17, and the keyboard 22 having an electrically conductive reinforcing member 24 at bottom thereof is mounted over the mother board 21. An electrically conductive member 23 for grounding is provided around the mother board 21.

The keyboard 22 has a size larger than the mother board 21 but smaller than the opening 18. As shown in FIG. 4, the electrically conductive reinforcing member 24 is provided below the keyboard 22 and in contact with the conductive member 23 of the mother board 21.

Holes 19b, 19c, 19d are provided around the frame 17, mother board 21, and reinforcing member 24, respectively, at the same positions as holes 19a, which are provided at the raised supports 20 in the bottom shell 15. Mounting screws 25, which are the mounting members, are passed through holes 19a, 19b, 19c, 19d, thereby integrating the top shell 14, bottom shell 15, mother board 21, and keyboard 22 into a single module.

A housing arrangement for a data processing apparatus thus comprised is assembled as follows.

The display 16 is first assembled to the top shell 14, and the hard disk drive unit (not shown in the figures) and floppy disk drive (FDD) 26 unit are assembled into the bottom shell 15. The top shell 14 and bottom shell 15 are then assembled. The mother board 21 is then mounted in the frame 17, the keyboard 22 is mounted over the mother board 21, and the mounting screws 25 are then screwed through the holes 19a, 19b, 19c, 19d in the raised supports 20, frame 17, mother board 21, and reinforcing member 24 to complete the assembly.

It is therefore possible to assemble the top shell 14, bottom shell 15, mother board 21, and keyboard 22 in a single step using the mounting screws 25, and the number of screws required for assembly can be significantly reduced.

When disassembling the data processing apparatus for maintenance or service, the keyboard 22 and mother board 21 can both be removed by simply removing the mounting screws 25, significantly improving serviceability. Assembly and disassembly is therefore simplified. The mother board 21 is also sealed in a box formed by the keyboard 22 reinforcing member 24 and the top shell 14, thus preventing leakage of radiation from the mother board 21. This eliminates the need for special radiation shield members, in turn eliminating the need to install or remove radiation shield members during assembly and disassembly, and thereby further simplifying data processing apparatus assembly and disassembly.

This structure also provides more effective radiation shielding because the conductive member 23 provided around the mother board 21 forms an electrically tight seal between the reinforcing member 24 and mother board 21.

Electrical conductance between the keyboard 22 and the mother board 21 is achieved by the conductive reinforcing member 24 of the keyboard 22 being in contact with the conductive member 23 provided around the mother board 21. The conductive member can also be provided around the mounting screw hole 19c. In fact, the conductive member 23 providing conductance to the conductive reinforcing member 24 can be provided at any suitable position on the mother board 21.

Figure 5:
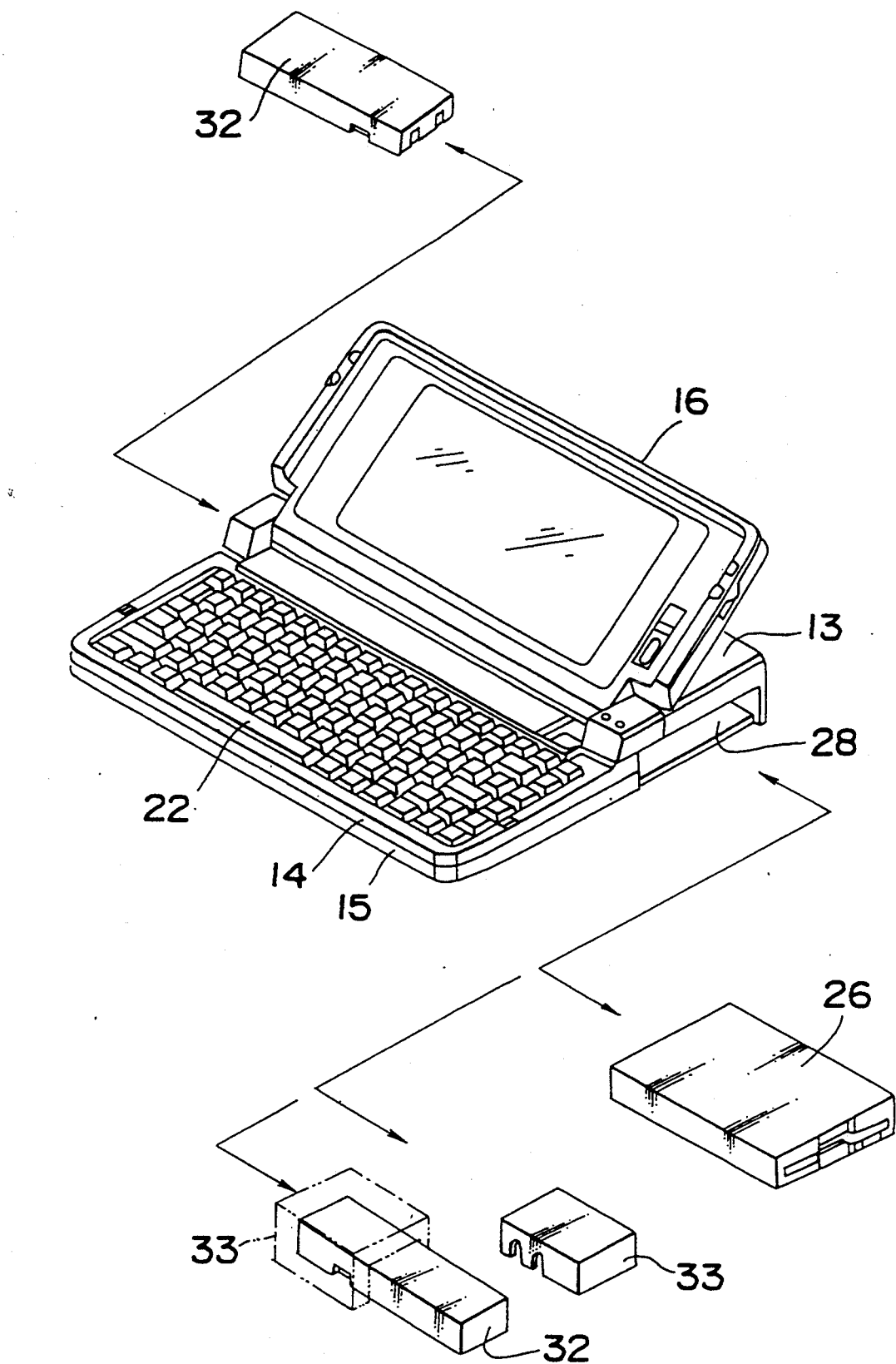
FIG. 5 is an explantory view of a housing arrangement for a data processing apparatus of the invention, particularly showing loading units.

The housing arrangement for a data processing apparatus according to the invention is further described below with reference to FIGS. 5, 6a and 6b.

Figure 6A:
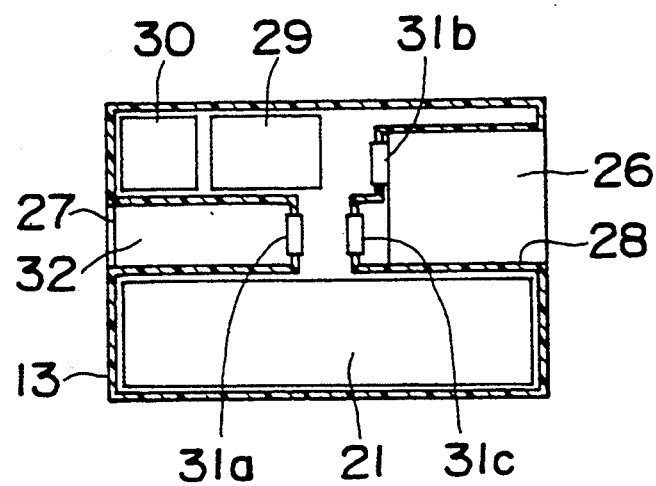
FIG. 6a is a plane cross section of a housing arrangement of the invention with the floppy disk unit installed.

As shown in FIG. 6a, a battery compartment 27, functional expansion unit dock 28, hard disk drive (HDD) 29, and communications controller 30 are provided in the back of the main housing 13. Terminals 31a, and 31b, 31c are provided on the battery compartment 27 and functional expansion unit dock 28, respectively.

The battery compartment 27 allows for loading a battery unit 32, and the functional expansion unit dock 28 allows for adding a FDD 26 or other device adding functionality. When a FDD 26 or other device is not loaded in the functional expansion unit dock 28, another battery unit 32 and shorting prevention case 33 can be loaded (FIG. 6b). The shorting prevention case 33 can be freely mounted and dismounted to the battery unit 32 to prevent shorting the battery unit 32 terminals when the battery unit 32 is not in use, as shown by an imaginary line in FIG. 5. When the battery unit 32 is loaded in the dock 28, the case 33 can be inserted in a space adjacent battery 32, as shown in FIG. 6b to completely close the dock 28.

Figure 6B:
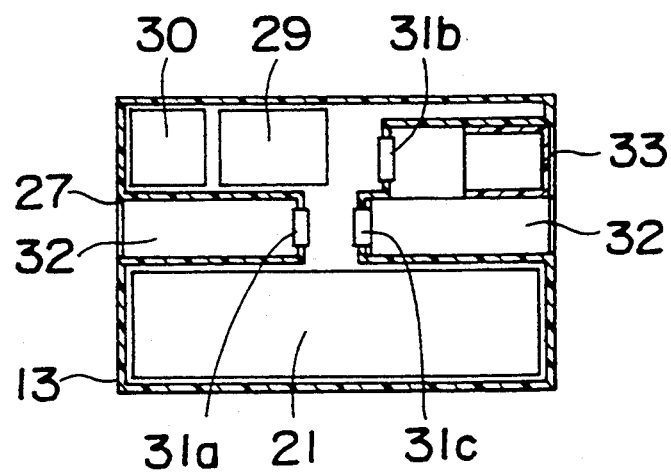
FIG. 6b is a plane cross section of a housing arrangement of the invention with the battery unit installed.

The operation of this data processing apparatus is described below for two cases, specifically, when the FDD 26 is loaded in the functional expansion unit dock 28, as shown in FIG. 6a, and when the battery unit 32 is loaded in the functional expansion unit dock 28, as shown in FIG. 6b.

First, the case shown in FIG. 6a is explained. The FDD 26 is inserted to the functional expansion unit dock 28 in contact with the terminal 31b so that conductivity exists to the FDD 26, i.e., so that the FDD 26 is in a driveable state. To then start the data processing apparatus, an AC power supply (not shown in the figures) can be connected, or a battery unit 32 can be inserted to the battery compartment 27 in contact with the terminal 31a to enable battery-powered operation.

Next, the case shown in FIG. 6b is explained. To load the battery unit 32 in the functional expansion unit dock 28, any FDD 26 or other functional expansion unit loaded in the functional expansion unit dock 28 must first be removed. The battery unit 32 can then be inserted to the functional expansion unit dock 28 to contact the terminal 31c. The shorting prevention case 33 is also inserted beside the battery unit 32 to close the gap in the opening of the functional expansion unit dock 28.

To then start the data processing apparatus, an AC power supply (not shown in the figures) can be connected, or battery-powered operation using the battery unit 32 in either the battery compartment 27 or the functional expansion unit dock 28 can be used.

By the embodiment described above, the data processing apparatus can be operated using a battery unit 32 loaded in both the battery compartment 27 and the functional expansion unit dock 28 because a battery unit 32 can be loaded in the functional expansion unit dock 28 when the FDD 26 is not loaded therein. As a result, extended battery-powered operation, i.e., extended continuous operation, is possible without using an AC power supply.

When the battery unit 32 is inserted in the functional expansion unit dock 28, dust and other foreign matter can be prevented from entering the functional expansion unit dock 28 and adhering to the terminal 31b if the functional expansion unit dock 28 is closed using the shorting prevention case 33. As a result, when the battery unit 32 and shorting prevention case 33 are removed and a FDD 26 is inserted, poor contact between the FDD 26 and terminal 31b can be prevented, and non-operation of the FDD 26 due to poor electrical contact when the power is turned on can be prevented.

It is therefore possible to access software stored on a floppy disk when extended battery-powered operation is not necessary and when the data processing apparatus is operated on AC power by loading a FDD 26 to the functional expansion unit dock 28.

It is to be noted that a device that can be loaded and unloaded to the battery compartment 27 similarly to the battery unit 32 is inserted together with the shorting prevention case 33 to the functional expansion unit dock 28, but the size of the battery unit inserted to the functional expansion unit dock 28 shall not be specifically limited, and any component that can be loaded in the functional expansion unit dock 28 with a positive electrical connection established, i.e., even devices that are larger than the functional expansion unit dock 28 and protrude to the outside thereof, can also be used. In addition, it is not always necessary to insert the shorting prevention case 33, and the shorting prevention case 33 can be eliminated as desired.

While a floppy disk drive unit was used by way of example as the functional expansion unit, a hard disk drive unit, IC card unit, communications unit, or other device expanding the functionality of the data processing apparatus can also be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A housing arrangement for a data processing apparatus comprising:
    a top shell having a top surface and an opening extending through said top shell;
    a bottom shell on which said top shell is mounted;
    an electrical circuit board removably mounted on said top surface of said top shell above said opening and having electronic components;
    an electrically conductive substrate having top and bottom faces, said bottom face being mounted on and in contact with said electrical circuit board; and
    a keyboard for inputting data to said electrical circuit board mounted on said top face of said electrically conductive substrate.

2. A housing arrangement according to claim 1 further comprising a connecting member for connecting the top shell, bottom shell, electrical circuit board, and conductive substrate of the keyboard in a single module.

3. A housing arrangement according to claim 1, further comprising an electrically conductive member provided on said electrical circuit board, said electrically conductive member electrically connected to said conductive substrate of the keyboard.

4. A housing arrangement according to claim 3, wherein said electrically conductive member is provided around the electrical circuit board.

5. A housing arrangement according to claim 1, further comprising a functional expansion unit dock for receiving either one of a functional expansion unit and a battery unit.

6. A housing arrangement according to claim 5 further comprising a battery compartment separately from the functional expansion unit dock for receiving a battery unit.

7. A housing arrangement according to claim 5, wherein said functional expansion unit is a memory device.

8. A housing arrangement according to claim 5, further comprising a covering member inserted with the battery unit to the functional expansion unit dock for blocking the opening in the functional expansion unit dock.

9. A housing arrangement according to claim 8, wherein said covering member is used for covering terminals of said battery unit, when the battery is unloaded.

10. A housing arrangement according to claim 1 wherein said electrically conductive substrate is positioned on a bottom surface of said keyboard and mounted on and in contact with said electrical circuit board.

11. A housing arrangement for a data processing apparatus comprising:
    a top shell having a top surface and an opening extending through said top shell;
    a bottom shell on which the top shell is mounted;
    an electrical circuit board removably mounted on said top surface of said top shell above said opening and having electronic components; and
    data input means mounted on and in contact with said electrical circuit board for inputting data to said electrical circuit board.

* * * * *